United States Patent [19]

Skinner

[11] Patent Number: 5,754,495

[45] Date of Patent: May 19, 1998

[54] METHOD FOR ACOUSTIC DETERMINATION OF THE LENGTH OF A FLUID CONDUIT

[75] Inventor: Neal G. Skinner, Lewisville, Tex.

[73] Assignee: Halliburton Energy Services, Inc., Dallas, Tex.

[21] Appl. No.: 648,522

[22] Filed: May 13, 1996

[51] Int. Cl.⁶ .............................. G01S 15/00; G01N 29/00
[52] U.S. Cl. ................................................ 367/99; 73/597
[58] Field of Search ............................ 367/99, 118, 124, 367/127; 73/597

[56] References Cited

U.S. PATENT DOCUMENTS

| | | | |
|---|---|---|---|
| 3,564,251 | 2/1971 | Youmans | 250/269 |
| 3,930,556 | 1/1976 | Kusuda et al. | 73/40.5 A |
| 4,584,676 | 4/1986 | Newman | 367/108 |
| 4,930,350 | 6/1990 | Bode et al. | 73/597 |
| 4,935,884 | 6/1990 | Hajicek | 367/127 |
| 5,195,059 | 3/1993 | Hiroshi et al. | 367/99 |
| 5,432,752 | 7/1995 | Ito et al. | 367/99 |

FOREIGN PATENT DOCUMENTS

| | | | |
|---|---|---|---|
| 9609561 | 3/1996 | WIPO | G01V 1/00 |

*Primary Examiner*—Ian J. Lobo
*Attorney, Agent, or Firm*—William M. Imwalle; Paul I. Herman

[57] ABSTRACT

A method and apparatus for determining the length of a fluid conduit using acoustics is disclosed. The inventive method for determining the length $L_{FC}$ of an unblocked section of fluid conduit, the unblocked section of the fluid conduit having a proximal and distal end, comprises the steps of:

(1) constructing a pressure containment system, the system comprising:
  (a) the unblocked section of the fluid conduit; and,
  (b) an extension conduit;
(2) connecting a pressure change sensing device to the system, the pressure change sensing device being capable of sensing changes in the pressure inside the system;
(3) filling the system with a fluid;
(4) generating at least one pressure wave in the system;
(5) timing the pressure wave from a timing starting point a known distance $L_3$ from the pressure change sensing device;
(6) measuring the time $T_1$ required for the pressure wave to travel from the timing starting point to the distal end of the fluid conduit and back to the pressure change sensing device;
(7) determining the time $T_2$ required for the pressure wave to travel through a portion of the system of known length $L_2$; and,
(8) calculating $L_{FC}$ by the equation $L_{FC}=((L_2 *T_1/T_2)-L_3)/2$.

This method yields results as accurate as those generated by wireline and electric line methods, but much faster, easier, and cheaper.

51 Claims, 11 Drawing Sheets

NORMAL PRESSURE RESPONSE

NORMAL PRESSURE RESPONSE
AIR ON TOP OF FLUID

5,754,495

METHOD FOR ACOUSTIC DETERMINATION OF THE LENGTH OF A FLUID CONDUIT

BACKGROUND OF THE INVENTION

It is often desirable to determine the length of a fluid conduit which is not readily measurable. For instance, it is often desirable in oilfield operations to determine the depth or position in a well that tools or other equipment are located. Many well service operations require accurate pipe length or tool depth measurements. These include, but are not limited to, formation evaluation (including drill stem testing), tubing conveyed perforating, MWD, LWD and other completion work.

Several methods exist for determining tool depth. The simplest is a pipe tally. This requires summing manual measurements of all tools and pipe sections run into the well. This method is prone to errors because it depends on many, repetitive manual measurements. Additional uncertainty exists from inconsistent make up lengths of threaded connections and the possibility of errors in the mathematical summing of the individual lengths.

Slick line or wireline depth measurements are well known and typically believed to be accurate to within approximately ±15 feet under many conditions.

Electric line measurements are often used for tool depth measurements. These are more accurate and typically believed to be accurate to within approximately ±3 feet under many conditions. Electric line operations are more expensive than slick line operations.

Both wireline and electric line methods require a wireline unit and significant time to run the depth correlation. Acquiring the wireline unit can be time-consuming and expensive. Further, all work must stop while the run is being made, wasting valuable rig and personnel time.

Another problem that can occur in oil or gas well operations is determination of whether a valve in the main bore is opened or closed. Traditionally, the status of the valve is determined by running a wireline tool down the well. If the depth of the valve is known, a possible alternate solution would be to determine the continuous open length of the wellbore, because when the valve is open, a longer, continuous fluid conduit exists than when the valve is closed. If an accurate measurement of the length of the open fluid conduit in the wellbore equals the known depth of the tool, then the valve must be closed. If an accurate measurement of the length of the open fluid conduit in the wellbore is significantly greater than the known depth of the tool, then the valve must be open.

Therefore what is needed is a simpler, quicker depth measurement test, that can be run from the top of the well, that requires no wireline unit or any other means to physically measure the depth of the tool (or to the bottom of the hole), and can be performed quickly, while yielding results at least as good as the best electric line measurements available. Equipment to carry out the method is also needed.

SUMMARY OF THE INVENTION

The inventive method for determining the length $L_{FC}$ of an unblocked section of fluid conduit, the unblocked section of the fluid conduit having a proximal and distal end, comprises the steps of:

(1) constructing a pressure containment system, the system comprising:
(a) the unblocked section of the fluid conduit; and,
(b) an extension conduit, the extension conduit having a known length and a proximal and distal end, the distal end being closed, the proximal end of the extension conduit being operably connected to the proximal end of the fluid conduit, the fluid conduit and the extension conduit being in fluid and pressure communication, the system being able to hold a fairly constant internal pressure;
(2) connecting a pressure change sensing device to the system, the pressure change sensing device being capable of sensing changes in the pressure inside the system;
(3) filling the system with a fluid;
(4) generating at least one pressure wave in the system;
(5) timing the pressure wave from a timing starting point a known distance $L_3$ from the pressure change sensing device, wherein $L_3$ is a positive number if the pressure change sensing device is intermediate the timing starting point and the distal end of the fluid conduit, and wherein $L_3$ is a negative number if the pressure change sensing device is not intermediate the timing starting point and the distal end of the fluid conduit;
(6) measuring the time $T_1$ required for the pressure wave to travel from the timing starting point to the distal end of the fluid conduit and back to the pressure change sensing device;
(7) determining the time $T_2$ required for the pressure wave to travel through a portion of the system of known length $L_2$; and,
calculating $L_{FC}$ by the equation $L_{FC}=((L_2*T_1/T_2)-L_3)/2$.

In a preferred embodiment, $L_2$ is the distance from the distal end of the extension conduit to the pressure change sensing device, and the time $T_2$ is determined by measuring the time $T_3$ required for the pressure wave to travel from the pressure change sensing device to the distal end of the extension conduit and return to the pressure change sensing device, then calculating $T_2$ by the equation $T_2=T_3/2$.

In another preferred embodiment, $L_2$ is the distance from a point at which the pressure wave is initiated to the pressure change sensing device, and $T_2$ is determined by measuring the time required for the pressure wave to travel from the initiation point of the pressure wave to the pressure change sensing device.

In another preferred embodiment, $L_2$ is the distance between the pressure change sensing device and a second pressure change sensing device, and $T_2$ is the time required for the pressure wave to travel from either pressure change sensing device to the other.

In another preferred embodiment the starting timing point is also the point at which the pressure wave is initiated.

In another preferred embodiment the at least one pressure wave comprises two pressure waves, initially traveling in opposite direction through the system, the two pressure waves originating in the system proximate to the pressure change sensing device.

In another preferred embodiment, the pressure change sensing device is a pressure transducer.

In another preferred embodiment, the pressure change sensing device is operably connected to an output device, such as a computer or strip chart recorder.

In another preferred embodiment, the pressure wave is generated by a sudden release of pressure through a valve.

In another preferred embodiment of the present invention, the pressure change sensing device and the valve are located proximate to the proximal end of the extension conduit.

The inventive method can be used to determine the depth of a downhole tool in an oil or gas well, the tool defining the distal end of the fluid conduit. In such a case, the fluid conduit could be further defined by the interior of the tool string, the annulus formed between the tool string and the casing, or in some other manner.

The inventive method could also be used to determine whether a main valve in the well is opened or closed, by determining the length of the open fluid conduit and comparing that length to the known depth of the tool.

The inventive method can in fact be used to calculate the length of any unblocked section of a fluid conduit of indeterminate length in any application, not just in oilfield applications, if the column is capable of allowing the transmission of fairly uniform acoustic waves.

Apparatus to carry out the method is also disclosed.

DESCRIPTION OF THE PREFERRED EMBODIMENT

Figure 1:
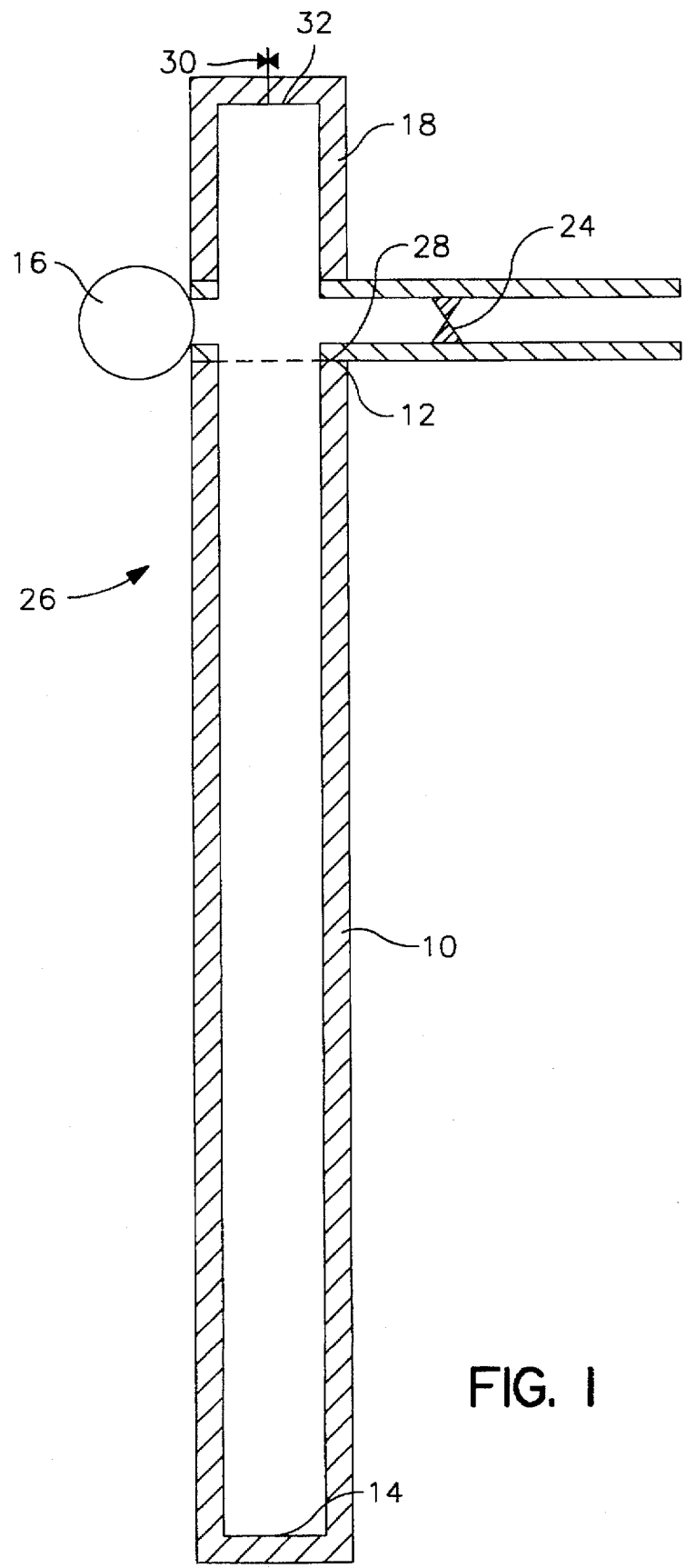
FIG. 1 is a highly schematicized representation of a preferred apparatus for use in the inventive method prior to initiation of pressure waves.

In the description which follows, like parts are marked throughout the specification and drawings with the same reference numerals, respectively. The drawings are not necessarily to scale and the proportions of certain parts have been exaggerated to better illustrate details and features of the invention. In the following description, the terms "upper," "upward," "lower," "below," "downhole" and the like, as used herein, shall mean in relation to the bottom, or furthest extent of, the surrounding wellbore even though the wellbore or portions of it may be deviated or horizontal. This invention can in fact be used in non-oilfield applications equally well. Where components of relatively well known design are employed, their structure and operation will not be described in detail.

This inventive method is capable of determining the length of an unblocked section of a fluid conduit. The fluid conduit need not be straight. In the case of oilfield operations, this method may be used to determine the length of a pipe, casing, or open hole that has a fixed and solid bottom and is fillable with fluid, or to determine the depth of a tool in an unblocked section of a fluid conduit. The inventive method may also be used to determine if a main valve in the well is opened or closed. In this description of the preferred embodiment, the description will be in terms of determining the length of a fluid conduit (such as tubing or casing) having a closed lower end, but the same method applies equally well to determining the depth of a tool that blocks a fluid conduit in a well, such as a packer blocking an annulus, or a testing tool blocking the end of a fluid column in a tool string.

In a preferred embodiment, referring now to FIG. 1 (not to scale), an unblocked section of fluid conduit 10 of unknown length $L_{FC}$ as measured from its upper (proximal) end 12 to its lower (distal) end 14, the distal end 14 being defined by whatever blocks or closes off the fluid conduit 10, such as a downhole tool, or the bottom of the well. The inventive method first requires the construction of a closed system including the fluid conduit, capable of holding pressure. Therefore, connected to the proximal end 12 of the fluid conduit 10 is an extension conduit 18. The extension conduit 18 has a proximal end 28 and a distal end 32, the proximal end 28 of the extension conduit being connected to the proximal end 12 of the fluid conduit. When measuring the depth of a well, the extension conduit would typically be a pipe. The preferred inventive method does not require that the pipe have a high pressure rating, with 1000 pounds per square inch (psi) being sufficient in most cases. The extension conduit 18 is of known length, which should be measured as accurately as possible. A length of 10 to 30 feet is recommended for oilfield uses. The extension conduit preferably has a needle valve 30 at its distal end 32 to allow the removal of gases. The extension conduit 18 and the fluid conduit 10 are in fluid and pressure communication.

A pressure change sensing device is in fluid communication with the interior of the extension conduit/fluid conduit system. In the disclosed preferred embodiment, the pressure change sensing device is a pressure transducer 16 connected to the proximal end 12 of the fluid conduit. The pressure transducer should have good resolution and sensitivity. High accuracy, good stability, and high temperature and pressure ratings are not as important. An inexpensive, commercially available strain gauge type transducer should be sufficient. However, any type of pressure change sensing device could be adapted to work in this invention. Further, while the pressure transducer 16 in this preferred embodiment is shown located at the proximal end of the extension conduit, in the inventive method it may also be located virtually anywhere along the length of the extension conduit 18 or the fluid conduit 10, as long as the distance $L_3$ from a timing starting point to the pressure change sensing device is readily measurable.

To perform the inventive method, a section of the system must have a known length $L_2$, the section being positioned such that the time $T_2$ required for a pressure wave to traverse the length $L_2$ can be measured. This can be done numerous ways. For example, if the pressure wave is generated from the distal end of the extension conduit, $L_2$ could be the distance from the distal end of the extension conduit to the pressure change sensing device, and $T_2$ would be the time required for the pressure wave to travel from its generation point at the distal end of the extension conduit to the pressure change sensing device. In another embodiment, the length $L_2$ could be the distance between two pressure change sensing devices, and $T_2$ would be the time required for the pressure wave to travel from one pressure change sensing device to the other. In the preferred embodiment disclosed herein, the time required for the pressure wave to travel from the pressure change sensing device to the distal end of the extension conduit and back to the pressure change sensing device is measured, and referred to as $T_3$. In such a method, $T_2$ is equal to $T_3/2$, and $L_2$ is the distance from the pressure change sensing device to the distal end of the extension conduit. A variation of the inventive method would have the pressure wave travel through any distances needed to be measured (whether $L_2$ or $L_3$) multiple times, then dividing the time required to travel that multiple of times by the appropriate number of cycles.

In the disclosed preferred embodiment, the distance from the distal end 32 of the extension conduit to the pressure transducer 16 is referred to as $L_2$, and the distance from the proximal end 12 of the fluid conduit to the pressure transducer 16 is referred to as $L_3$. The location of the transducer shown in this embodiment is preferred for ease of installation and improved resolution, and would have an $L_3$ of close to 0. As will be shown later, the transducer 16 should not be too close to the distal end 32 of the extension conduit.

Preferably, for ease of analysis and determination of $L_{FC}$, a computer (not shown) is connected to the pressure change sensing device. The computer serves as a recording device, to record pressure (or pressure changes) over time. A strip chart recorder could also work in the inventive method. The method could also be used without recording output from the pressure change sensing device, as long as the time between pulses (discussed below) is ascertainable.

The inventive method requires that a pressure wave be generated in the system. This can be accomplished in any number of ways. For example, an explosive charge could be used. In the disclosed preferred embodiment a valve is used as a pressure wave generating device. The valve 24 is also connected at the proximal end 12 of the fluid conduit, preferably at the proximal end of the extension conduit 18. A means of generating pressures preferably as high as 1000 psi is connected to the valve. The valve 24 should have an open flow area large enough to bleed 100–500 psi from the system quickly and then close quickly. The bleed down/close operation needs to happen in preferably less than 3 seconds. A 2 or 3 inch Halliburton® Lo-Torc® valve is acceptable.

The valve 24 should preferably be located proximate to the pressure transducer 16, preferably with both the valve and the pressure transducer being the same distance from the distal end 32 of the extension conduit. However, the valve can in fact be located anywhere along the length of the extension conduit or the fluid conduit, as long as the valve (or whatever other device is being used to generate at least one pressure wave) can cause at least one pressure wave to be generated that travels back and forth through the length of the fluid conduit and the extension conduit. Other devices that could be used to generate pressure waves include a piston or a gas injection device.

For ease of use, the extension conduit, pressure change sensing device, and wave generator can all be connected into a single tool assembly prior to usage. Then, upon arrival at the location of the fluid conduit to be tested, the entire assembly is simply connected onto the fluid conduit, and the system is ready to use.

The basis for this invention is acoustics. An easily measured property of all materials is its acoustic impedance. Acoustic impedance is a measure of how readily sound (which is a pressure wave) travels through a particular material.

When looking at an interface between two materials (e.g., where drilling mud sits on the surface of a steel tool) a comparison of their acoustic impedance can indicate how the pressure wave will reflect at the interface. In the case of drilling mud setting on a tool, it is expected that 86% of a pressure wave traveling down through the mud will reflect off on the steel surface. This means that a pressure wave sent down the fluid conduit will reflect back up the fluid conduit to the distal end of the extension conduit, reflect again, go back down, and so on, and still be measurable by the pressure change sensing device possibly numerous times before fading to a level below the sensitivity of the pressure change sensing device.

In the preferred embodiment, after the extension conduit 18, valve 24, and pressure transducer 16 are sealingly connected to the fluid conduit 10 to form a pressure containment system 26. The system 26 is then completely filled with a liquid, typically water, drilling mud, or oil, whichever is most practicable to the situation. The method may also be performed with the entire fluid conduit 10 and extension conduit 18 filled with a gas. In the case of actually drilling operations or most other oilfield applications, the fluid conduit will be at least partially filled already with liquid (drilling mud or produced oil), and as it would be difficult to completely remove that liquid from the fluid conduit, it is much simpler to fill the fluid conduit and extension conduit with a liquid. Hence, the preferred method is described here using a liquid.

The preferred embodiment includes a needle valve 30 operably connected to the interior of the distal end 32 of the extension conduit. The needle valve 30 is opened to allow all trapped gases to escape while liquid is pumped in through the valve 24, until the system is purged. The needle valve 30 is then closed, and the system pressurized to a relatively low pressure, such as 100–500 psi.

Figure 2:
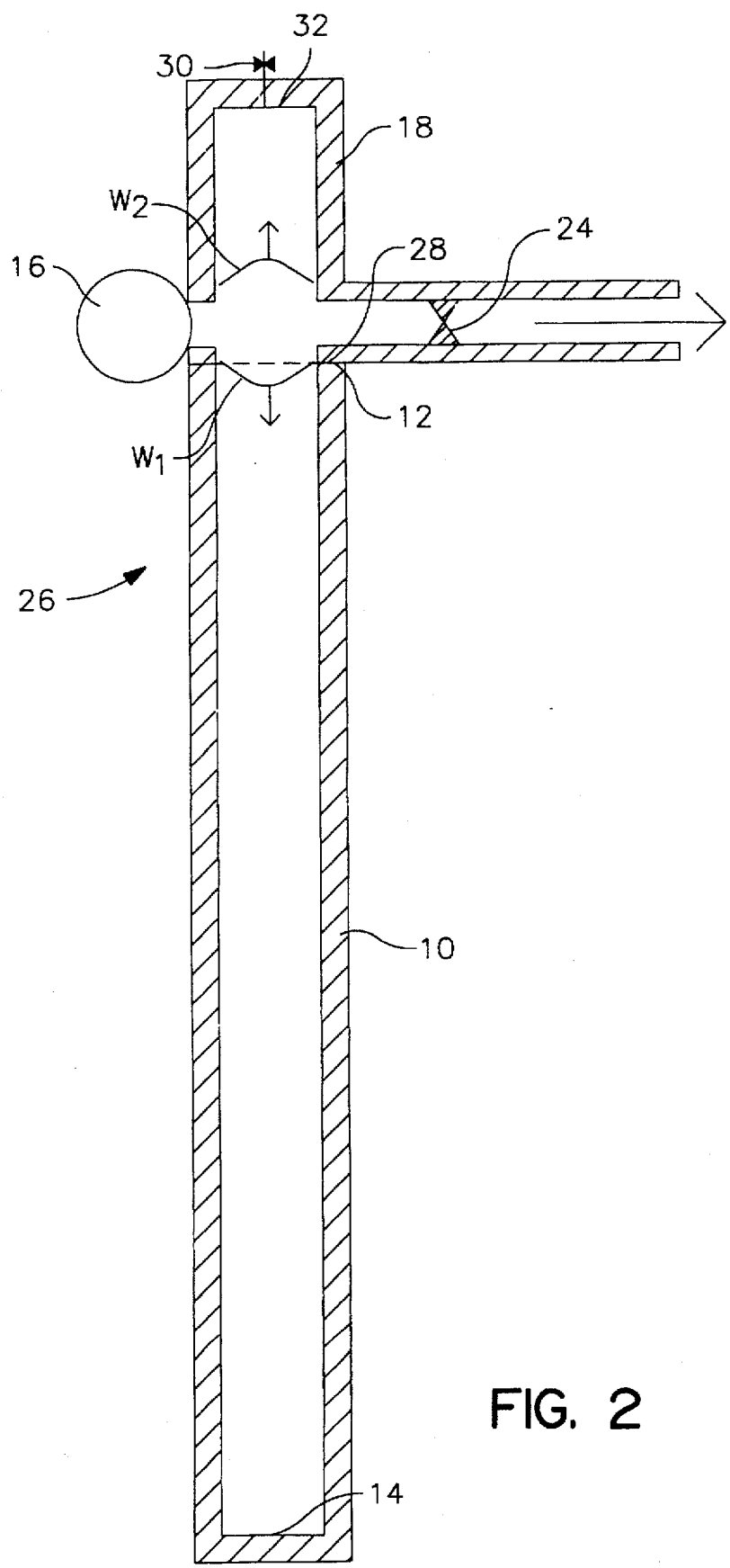
FIG. 2 is a highly schematicized representation of preferred apparatus for use in the inventive method at time t=0, when pressure waves $W_1$ (moving downward) and $W_2$ (moving upward) are initiated.

In the inventive method, a pressure wave needs to be generated. In the preferred embodiment, pressure behind the valve 24 is reduced to a much lower figure, such as one atmosphere. The valve 24 is then opened and closed quickly. The time at which this is done is referred to herein as time $t=0$. Opening the valve 24 causes a rapid decrease in pressure and a pair of pressure waves are generated. The first wave ($W_1$) travels down the fluid conduit 10 towards its distal end 14. The second wave ($W_2$) travels up the extension conduit 18 towards its distal end 32. See FIG. 2. Note that multiple valves may be used in place of a single valve for filling, pressurizing, and relieving pressure. Note also that if the valve or other wave generating device is positioned near the distal ends of either the extension conduit or the fluid conduit, only one wave will be generated, which may also be used with the inventive method.

Figure 3:
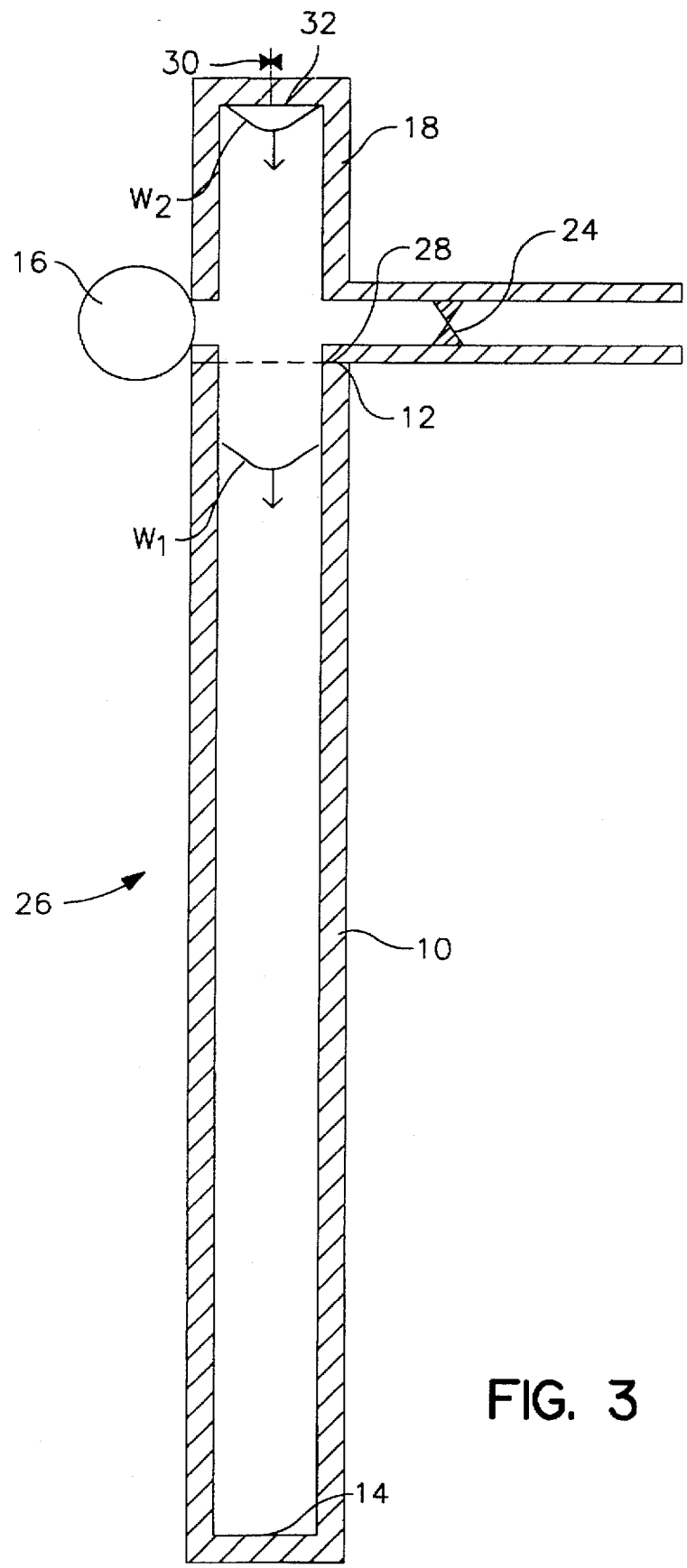
FIG. 3 is a highly schematicized representation of a preferred apparatus for use in the inventive method at time $t=T_3/2$, when pressure wave $W_2$ is reflecting off of the distal end of the extension conduit.

In FIGS. 3–9, "$T_3$" refers to the amount of time it takes the initially upwardly traveling $W_2$ to travel to the distal end 32 of the extension conduit, reflect, and travel back to the pressure transducer 16. "$T_1$" refers to the amount of time it takes the initially downwardly traveling $W_1$ to reach the distal end 14 of the fluid conduit, reflect, and return to the pressure transducer 16. Referring now to FIG. 3, at time $t=T_3/2$, $W_2$ reflects off of the distal end 32 of the extension conduit and begins to travel downward, following $W_1$. Note that system pressure is preferably not reduced to 0 psi.

Figure 4:
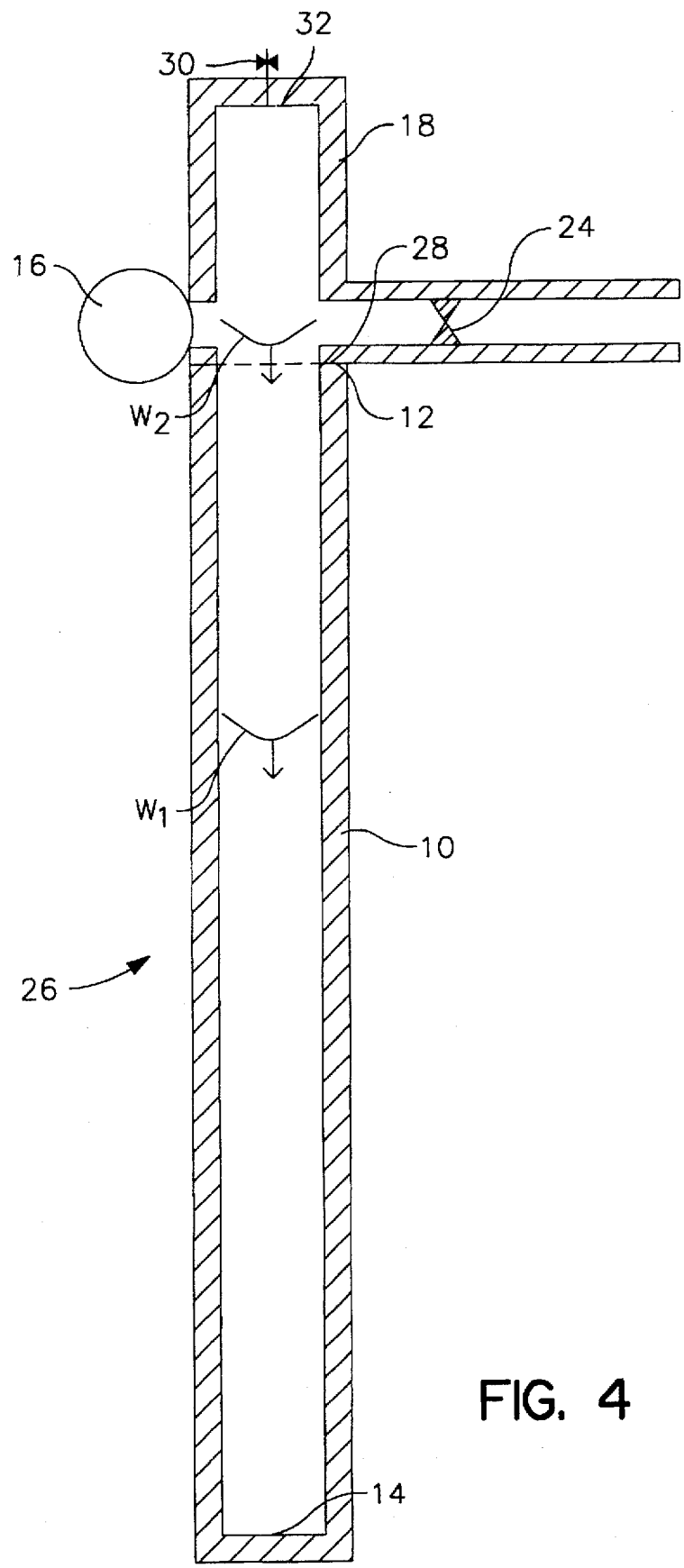
FIG. 4 is a highly schematicized representation of preferred apparatus for use in the inventive method at time $t=T_3$, when pressure wave $W_2$ has returned to the pressure transducer.

Referring now to FIG. 4, at time $t=T_3$, $W_2$ is at the pressure transducer 16 and $W_1$ is further down the fluid conduit 10. Note that the pressure transducer 16 should see $W_2$ passing at this time.

Figure 5:
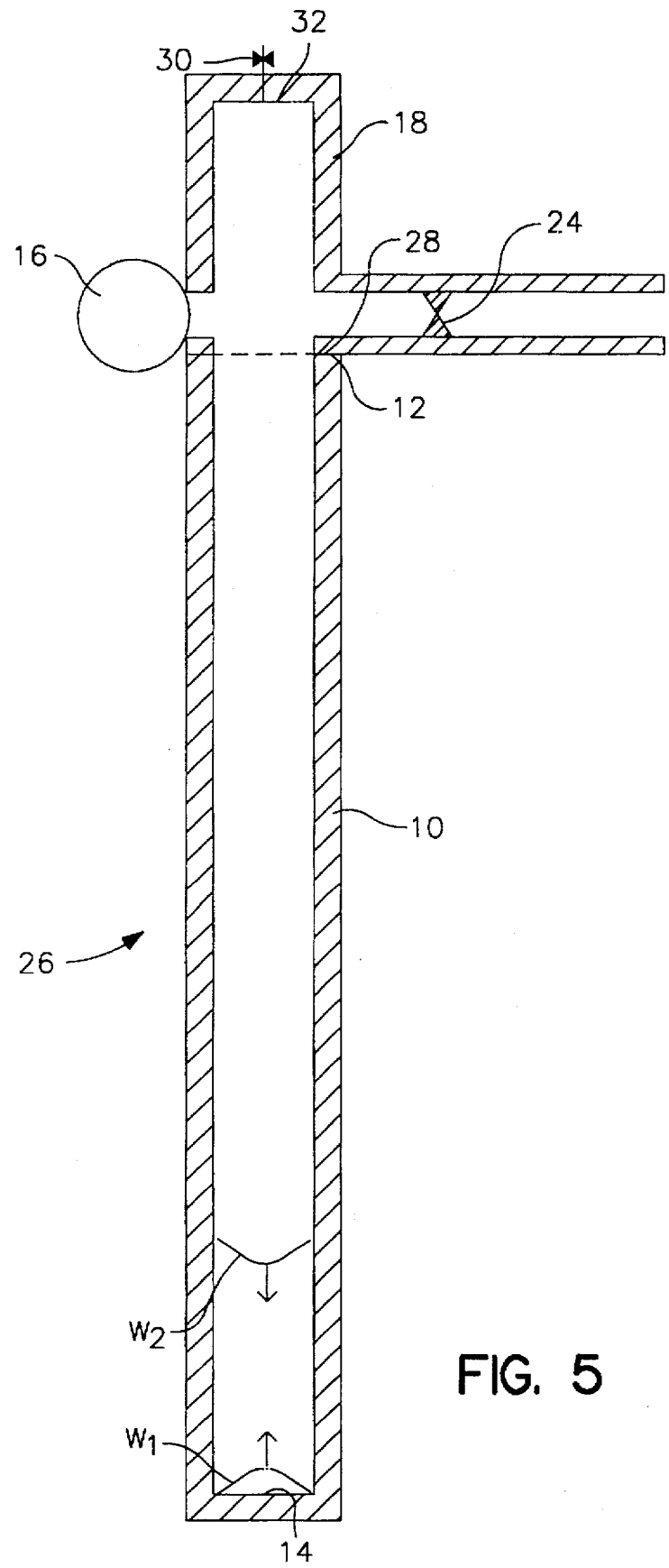
FIG. 5 is a highly schematicized representation of a preferred apparatus for use in the inventive method at time $t=T_1/2$, when pressure wave $W_1$ is reflecting off of the distal end of the fluid conduit.

Referring now to FIG. 5, at time $t=T_1/2$, $W_1$ reflects off of the distal end 14 of the fluid conduit and starts back toward the pressure transducer 16. $W_2$ is still traveling downward.

Figure 6:
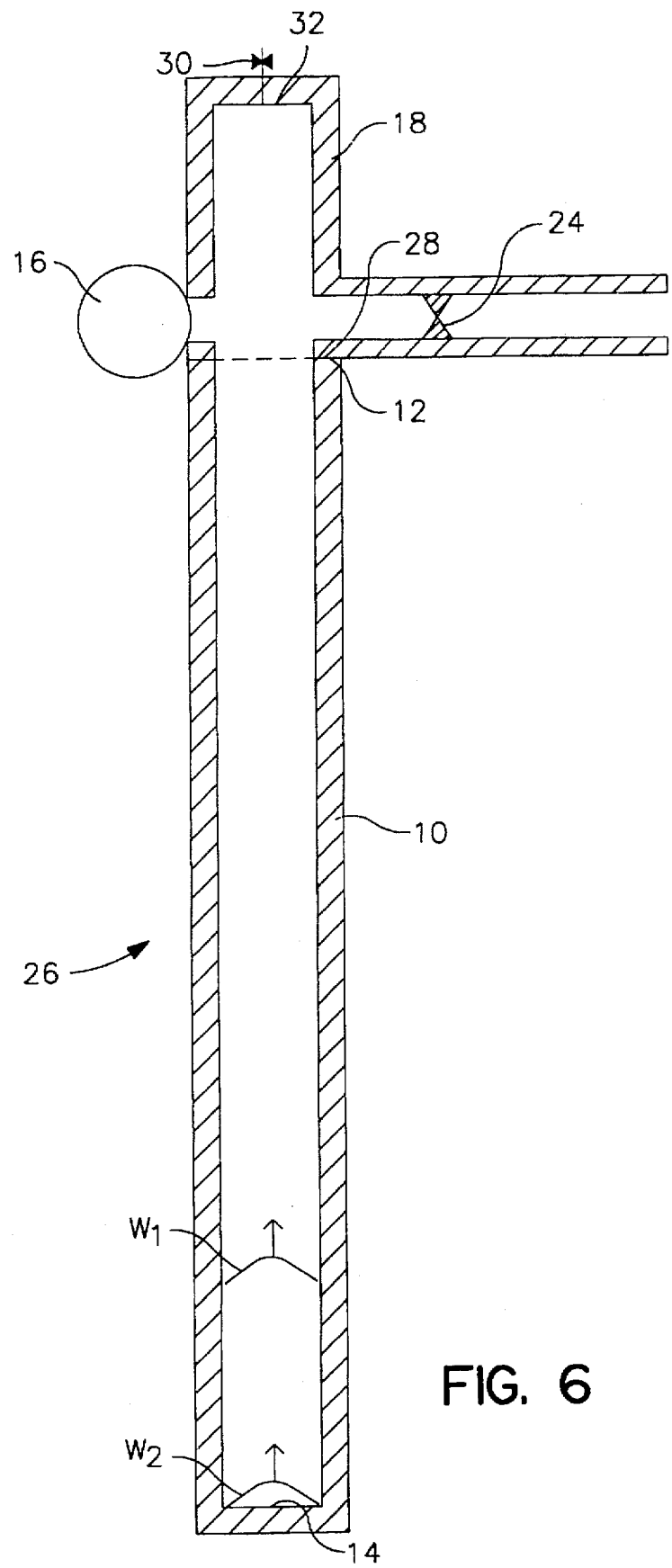
FIG. 6 is a highly schematicized representation of a preferred apparatus for use in the inventive method at time $t=T_1/2+T_3$, when pressure wave $W_2$ is reflecting off of the distal end of the fluid conduit.

Referring now to FIG. 6, at time $t=T_1/2+T_3$, $W_2$ reflects off the distal end 14 of the fluid conduit and follows $W_1$ up the fluid conduit 10.

Figure 7:
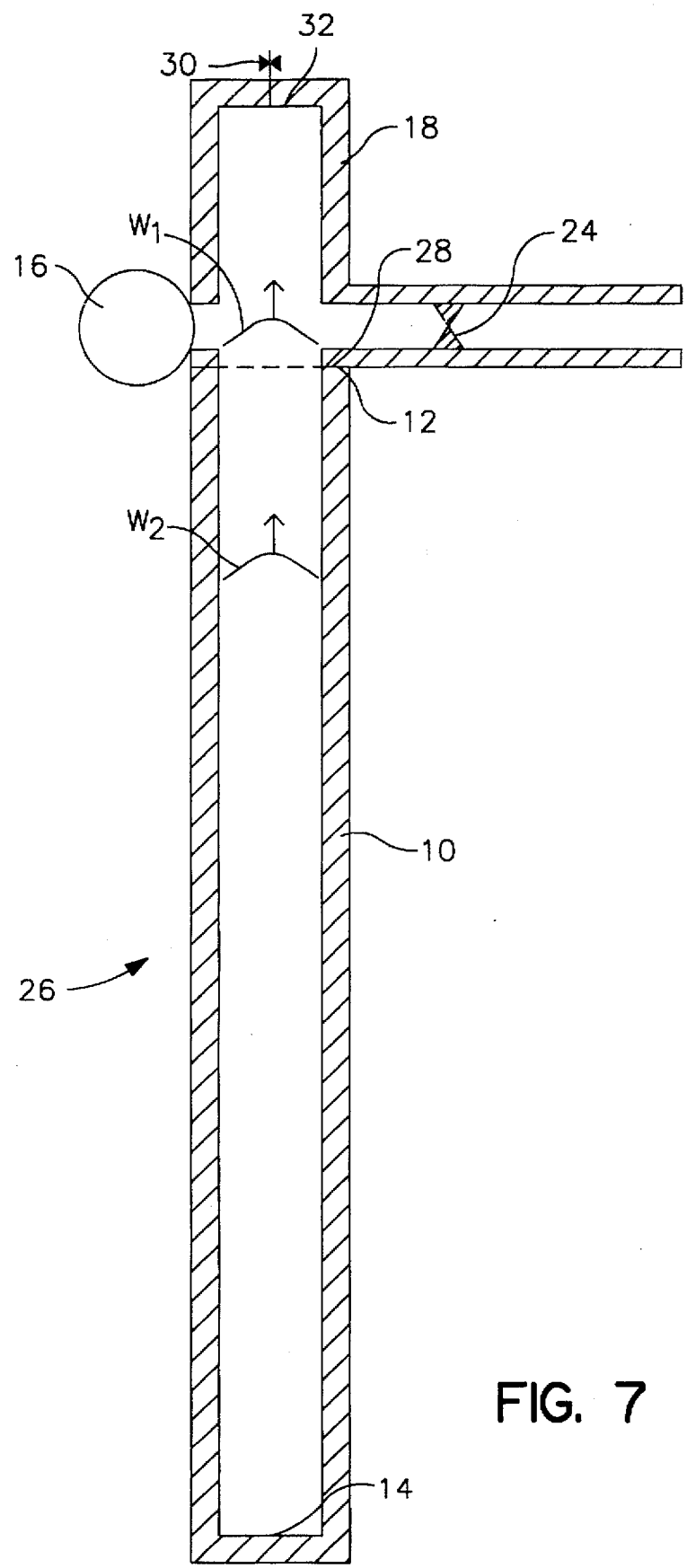
FIG. 7 is a highly schematicized representation of a preferred apparatus for use in the inventive method at time $t=T_1$, when pressure wave $W_1$ has returned to the pressure transducer.

Referring now to FIG. 7, at time $t=T_1$, $W_1$ is back at the pressure transducer 16 and $W_2$ is following. At this point, the pressure transducer 16 should record $W_1$ passing.

Figure 8:
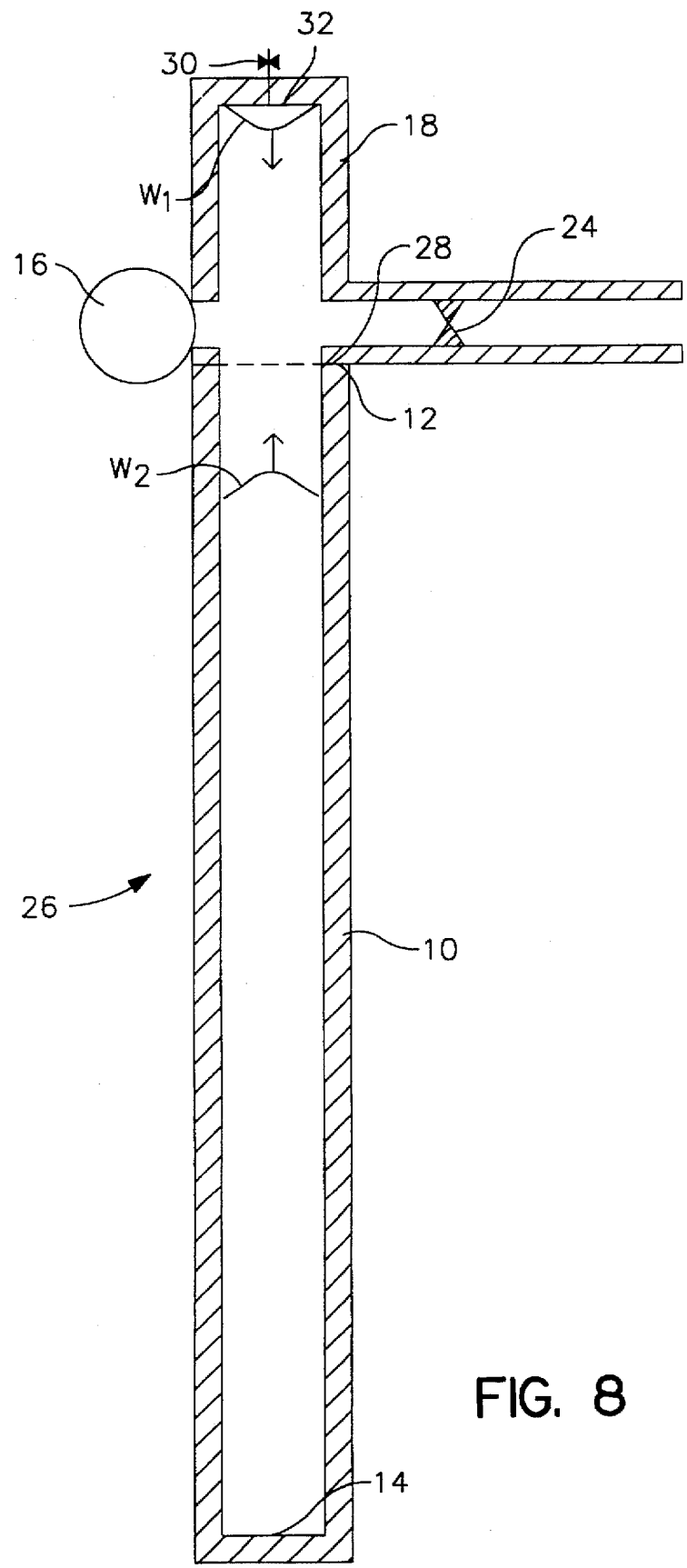
FIG. 8 is a highly schematicized representation of a preferred apparatus for use in the inventive method at time $t=T_1+T_3/2$, when pressure wave $W_2$ reflects off of the distal end of the extension conduit.

Referring now to FIG. 8, at time $t=T_1+T_3/2$, $W_1$ reflects off of the distal end 32 of the extension conduit and begins moving downward toward $W_2$. Both waves are now traveling toward one another. Both are traveling at the same velocity and are equally distant from the pressure transducer 16.

Figure 9:
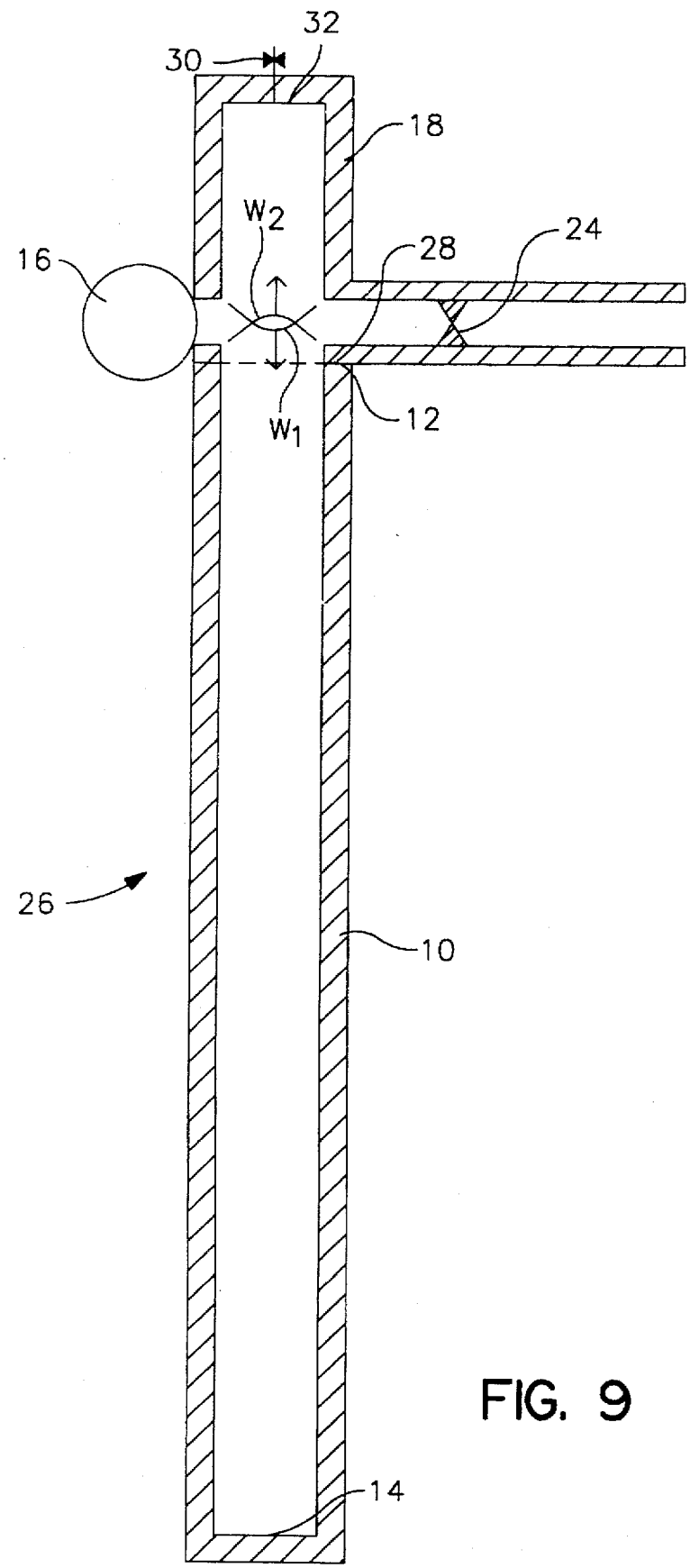
FIG. 9 is a highly schematicized representation of a preferred apparatus for use in the inventive method at time $t=T_1+T_3$, when pressure waves $W_1$ and $W_2$ meet at the pressure transducer.

Referring now to FIG. 9, at time $t=T_1+T_3$, both waves are coincident at the pressure transducer 16. The waves should be detected by the pressure transducer 16, and their combined amplitudes should be observed as a strong, single pulse.

The waves will then again travel through the entire system in a repetitive manner, the waves being reduced each cycle, due to the absorption by the steel surfaces at the distal ends of the extension conduit and fluid conduit, as well as due to friction with the side walls, and other energy loses. Further, noise is generated by couplings and other minor reflective surfaces. After several cycles, the waves will no longer be measurable.

Figure 10:
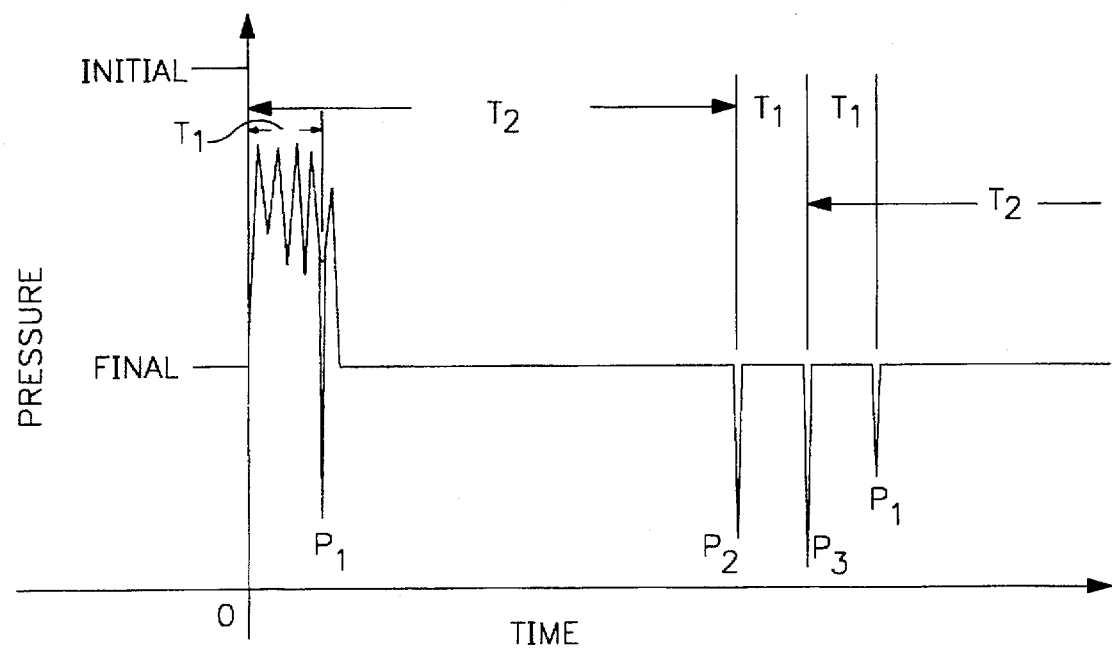
FIG. 10 is a sample plot of time vs. pressure output from a computer used in a preferred embodiment of the inventive method.

The values of $T_1$ and $T_3$ can be accurately determined from recorded pressure data. Alternatively, the output from the pressure change sensing device could simply be observed, and the time $T_1$ and $T_3$ determined based on those observations. FIG. 10 shows an expected, normal pressure plot for the preferred system. Note that the early pressure data will probably be unusable because of the turbulence associated with the sudden pressure drop from opening the valve 24.

Three distinct, repeating, negative pressure pulses $P_1$, $P_2$, and $P_3$, should be observed in a normal pressure plot. $P_1$ occurs at time $T_3$, as shown in FIG. 4, when $W_2$ reflects off of the distal end of the extension conduit and returns to the pressure transducer. $P_2$ occurs at time $T_1$, as shown in FIG. 7, when $W_1$ returns to the pressure transducer after reflecting off the distal end of the fluid conduit. $P_3$ occurs at time $T_1+T_3$, as shown in FIG. 9, when $W_1$ and $W_2$ simultaneously arrive back at the pressure transducer after both have made a full circuit of the entire length of the system. The approximate relative magnitudes of the pulses are shown in FIG. 10. Each successive set of three pulses should be smaller than its predecessor. Referring to FIG. 10, $T_3$ can be measured a number of time, such as from $P_2$ to $P_3$ (as well as from $P_3$ to the next $P_1$), and the time between the pulses from $P_3$ to the next $P_2$ is also a measure of $T_1$. Note that the first $P_1$ may not be readily identifiable due to initial noise in the system at the time of the initiation of the waves $W_1$ and $W_2$.

As is readily apparent, if the pressure transducer 16 and valve 24 are too close to the distal end of the extension conduit, the time $T_3$ will be too small to accurately measure relative to the time $T_1$, even with the use of a digital feed to a computer. It is preferred that the ratio of $T_1/T_3$ not be below 1:1000.

In the preferred embodiment, $T_2=T_3/2$. Once the data has been recorded, the length $L_{FC}$ of a fluid column extending from the pressure transducer 16 to the distal end 14 of the fluid conduit is calculated by the following equation: $L_{FC}=((L_2*T_1/T_2)-L_3)/2$.

If one is attempting to determine the depth of a tool, one will have to take into consideration whether the proximal end of the fluid conduit ends exactly at the surface of the earth. If not, then the distance $L_S$ from the surface of the earth to the proximal end of the fluid conduit will have to be appropriately taken into account. Specifically, if the proximal end of the fluid conduit is above the surface of the earth, then the distance $L_S$ will need to be subtracted from the distance $L_1$ to properly determine the depth of the tool. If the proximal end of the fluid conduit is below the surface of the earth, then the distance $L_S$ will need to be added to the distance $L_1$ to properly determine the depth of the tool.

The inventive method can also be used in oil or gas well operations to determine if a valve in the main bore that is at a known depth is opened or closed. This is done by determining the open length of the wellbore, because when the valve is open, a longer, continuous fluid conduit exists than when the valve is closed. If an accurate measurement of the length of the open fluid conduit in the wellbore made by the inventive method equals the known depth of the tool, then the valve must be closed. If an accurate measurement of the length of the open fluid conduit in the wellbore by the inventive method is significantly greater than the known depth of the tool, then the valve must be open.

If air is present in the distal end 32 of the extension conduit, the measurement of $L_{FC}$ is invalid. This is because instead of reflecting solely off of the mud-steel interface at the distal end 32 of the extension conduit, waves are reflected from a mud-air interface at some unknown distance which is less than $L_2$. The apparent measurement of $T_3$ will be incorrect and use of the equations set forth herein will result in a false measurement of $L_{FC}$.

Fortunately, since the reflection coefficient of the mud-air interface is −1, the recorded pressure profile will be much different. The expected recorded pressure data for the system with air in the distal end 32 of extension conduit should look like FIG. 11. Note that instead of three negative pulses, the pattern is one negative pulse $P_4$, followed by a larger positive pulse $P_5$, followed by a third negative pulse $P_6$ which is smaller than the first. This is a clear diagnostic aid to determine the validity of the depth measurement.

Figure 11:
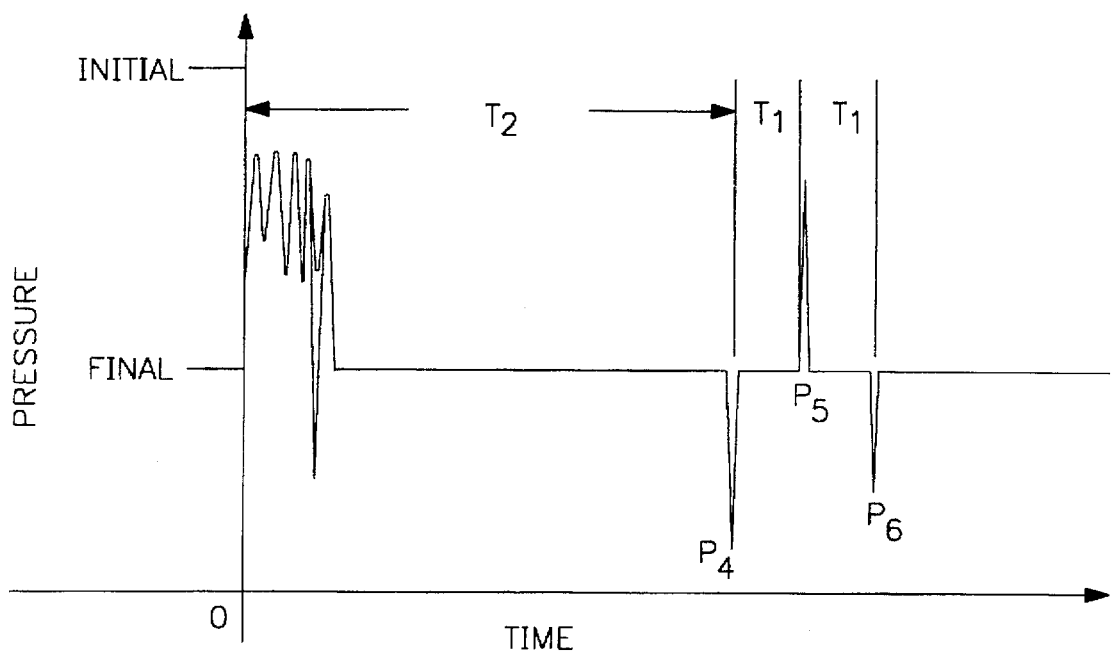
FIG. 11 is another sample plot of time vs. pressure output from a computer used in a preferred embodiment of the inventive method.

If the measurement is attempted and the recorded pressure response is similar to that in FIG. 11, air should be bled from the system with the needle valve 30 in the distal end 32 of the extension conduit and the measurement repeated until the observed response is similar to the one in FIG. 10.

The analysis and descriptions of pressure wave behavior are first order approximations. It is probable that a small reflection will be observed from the upsets between each joint of pipe in the well. Attenuation of pressure waves during transit is not considered in the description presented, but attenuation should only change the magnitude of the pressure pulses. The pulses should still be readily recognizable. Further, the system described assumes a flat surface at the top and the bottom. For a real system, a flat surface at the distal end of the extension conduit should be easy to obtain. Unfortunately, a flat surface at the distal end 14 of the fluid conduit will probably not be possible. This may potentially complicate the identification of the three characteristic pressure pulses, though they should still be readily identifiable. Because a computer capable of recording data at very small time intervals and constant velocity pressure waves are used, very high precision and accuracy are possible, equal or superior to the mechanical measuring methods using wireline or electric line.

With this method and apparatus, it is not necessary to run a wireline or electric line down the entire length of the fluid conduit, both of which operations can be time consuming. Indeed, the apparatus can be set up and the method run in a relatively much shorter time. Further, no wireline or electric line rigs are needed, and the service job is completed without any intrusion into the well itself.

Thus, the invention is able to meet all the objectives described above. The foregoing description and drawings of the invention are explanatory and illustrative thereof, and various changes in sizes, shapes, materials, and arrangement of parts, as well as certain details of the illustrated construction, may be made within the scope of the appended claims without departing from the true spirit of the invention. Also, the inventive method described above can be used to determine the length to the closed end of any pipe or other unblocked section of fluid conduit. Accordingly, while the present invention has been described herein in detail to its preferred embodiment, it is to be understood that this disclosure is only illustrative and exemplary of the present invention and is made merely for the purposes of providing an enabling disclosure of the invention. The foregoing disclosure is neither intended nor to be construed to limit the present invention or otherwise to exclude any such embodiments, adaptations, variations, modifications, or equivalent arrangements, the present invention being limited only by the claims appended hereto and the equivalents thereof.

I claim:

1. A method for determining the length $L_{FC}$ of an unblocked section of fluid conduit, the unblocked section of the fluid conduit having a proximal and distal end, the method comprising the steps of:

constructing a pressure containment system, the system comprising:
      the unblocked section of the fluid conduit; and,
      an extension conduit, the extension conduit having a known length and a proximal and distal end, the distal end being closed, the proximal end of the extension conduit being operably connected to the proximal end of the fluid conduit, the fluid conduit and the extension conduit being in fluid and pressure communication, the system being able to hold a fairly constant internal pressure;
   connecting a pressure change sensing device to the system, the pressure change sensing device being capable of sensing changes in the pressure inside the system;
   filling the system completely with a fluid;
   generating at least one pressure wave in the system;
   timing the pressure wave from a timing starting point a known distance $L_3$ from the pressure change sensing device, wherein $L_3$ is a positive number if the pressure change sensing device is intermediate the timing starting point and the distal end of the fluid conduit, and wherein $L_3$ is a negative number if the pressure change sensing device is not intermediate the timing starting point and the distal end of the fluid conduit;
   measuring the time $T_1$ required for the pressure wave to travel from the timing starting point to the distal end of the fluid conduit and back to the pressure change sensing device;
   determining the time $T_2$ required for the pressure wave to travel through a portion of the system of known length $L_2$; and,
   calculating $L_{FC}$ by the equation $L_{FC}=((L_2*T_1/T_2)-L_3)/2$.

2. The method of claim 1, wherein $L_2$ is the distance from the distal end of the extension conduit to the pressure change sensing device, and further wherein the step of determining the time $T_2$ is accomplished by measuring the time $T_3$ required for the pressure wave to travel from the pressure change sensing device to the distal end of the extension conduit and return to the pressure change sensing device, then calculating $T_2$ by the equation $T_2=T_3/2$.

3. The method of claim 1, wherein $L_2$ is the distance from a point at which the pressure wave is initiated to the pressure change sensing device, and further wherein $T_2$ is determined by measuring the time required for the pressure wave to travel from the initiation point of the pressure wave to the pressure change sensing device.

4. The method of claim 1, wherein the distance $L_2$ is the distance between the pressure change sensing device and a second pressure change sensing device, and further wherein the time $T_2$ is the time required for the pressure wave to travel from either pressure change sensing device to the other.

5. The method of claim 1, wherein the starting timing point is a point at which the pressure wave is initiated.

6. The method of claim 1, wherein the at least one pressure wave comprises two pressure waves, initially traveling in opposite direction through the system.

7. The method of claim 6, wherein the two pressure waves are originated in the system proximate to the pressure change sensing device.

8. The method of claim 1, wherein the system further comprises a valve capable of suddenly releasing enough pressure from the system to create the at least one pressure wave in the system, the valve being in fluid communication with the interior of the system, and positioned proximate to the pressure change sensing device, and wherein the method further comprises the steps of:

pressurizing the system to a starting pressure; and,
   rapidly venting some of the fluid out through the valve, thereby causing a sudden pressure drop inside the system, and thereby generating the at least one pressure wave.

9. The method of claim 8, wherein the valve and pressure change sensing device are located proximate to the proximal end of the extension conduit.

10. The method of claim 8, wherein the valve is capable of releasing 100–500 pounds per square inch of pressure from the interior of the system in less than 3 seconds.

11. The method of claim 8, wherein the valve and pressure change sensing device are located between the fluid conduit and extension conduit.

12. The method of claim 8, wherein the valve and pressure change sensing device are located between the distal and proximal ends of the extension conduit.

13. The method of claim 8, wherein the valve and pressure change sensing device are located between the distal and proximal ends of the unblocked section of the fluid conduit.

14. The method of claim 1, wherein the wave generation is caused by an explosive charge.

15. The method of claim 1, wherein the pressure change sensing device is capable of measuring pressure.

16. The method of claim 15, wherein the pressure change sensing device is a pressure transducer.

17. The method of claim 16, wherein the pressure transducer is a strain gauge type transducer.

18. The method of claim 1, wherein the pressure change sensing device is operably connected to an output device capable of recording pressure changes over time.

19. The method of claim 18, wherein the output device is a strip chart recorder.

20. The method of claim 18, wherein the output device is a computer.

21. The method of claim 1, wherein the extension conduit is positioned approximately axially in-line with the fluid conduit.

22. The method of claim 1, wherein the length of the extension conduit is 10 to 30 feet.

23. The method of claim 1, wherein the system further comprises a needle valve operably connected to the distal end of the extension conduit.

24. The method of claim 1, wherein the distal end of the fluid conduit is bounded by a downhole tool.

25. The method of claim 24, wherein the fluid conduit is further bounded by the interior of a tool pipe string.

26. The method of claim 24, wherein the fluid conduit is further bounded by an annulus, the annulus being defined between a casing in a well and production tubing.

27. A method for determining the depth $D_1$ of a downhole tool in an oil or gas well, the well having a proximal and distal end, the well having at least one unblocked section of fluid conduit extending uninterrupted from the proximal end of the well to the tool, the fluid conduit having a proximal and distal end, the method comprising the steps of, the proximal end of the fluid conduit being a known distance $L_S$ from the surface of the earth, $L_S$ being negative if the proximal end of the fluid conduit is above the surface of the earth, and $L_S$ being positive if the proximal end of the fluid conduit is below the surface of the earth:

constructing a pressure containment system, the system comprising:
the unblocked section of the fluid conduit; and,
an extension conduit, the extension conduit having a known length and a proximal and distal end, the distal end being closed, the proximal end of the extension conduit being operably connected to the proximal end of the fluid conduit, the fluid conduit and the extension conduit being in fluid and pressure communication, the system being able to hold a fairly constant internal pressure;

connecting a pressure change sensing device to the system, the pressure change sensing device being capable of sensing changes in the pressure inside the system;

filling the system completely with a fluid;

generating at least one pressure wave in the system;

timing the pressure wave from a timing starting point a known distance $L_3$ from the pressure change sensing device, wherein $L_3$ is a positive number if the pressure change sensing device is intermediate the timing starting point and the tool, and wherein $L_3$ is a negative number if the pressure change sensing device is not intermediate the timing starting point and the tool;

measuring the time $T_1$ required for the pressure wave to travel from the timing starting point to the tool and back to the pressure change sensing device;

determining the time $T_2$ required for the pressure wave to travel through a portion of the system of known length $L_2$; and, calculating the depth to the tool by the equation $D_1=((L_2*T_1/T_2)-L_3)/2)+L_S$.

28. The method of claim 27, wherein $L_2$ is the distance from the distal end of the extension conduit to the pressure change sensing device, and further wherein the step of determining the time $T_2$ is accomplished by measuring the time $T_3$ required for the pressure wave to travel from the pressure change sensing device to the distal end of the extension conduit and return to the pressure change sensing device, then calculating $T_2$ by the equation $T_2=T_3/2$.

29. The method of claim 27, wherein $L_2$ is the distance from a point at which the pressure wave is initiated to the pressure change sensing device, and further wherein $T_2$ is determined by measuring the time required for the pressure wave to travel from the initiation point of the pressure wave to the pressure change sensing device.

30. The method of claim 27, wherein the distance $L_2$ is the distance between the pressure change sensing device and a second pressure change sensing device, and further wherein the time $T_2$ is the time required for the pressure wave to travel from either pressure change sensing device to the other.

31. The method of claim 27, wherein the starting timing point is a point at which the pressure wave is initiated.

32. The method of claim 27, wherein the at least one pressure wave comprises two pressure waves, initially traveling in opposite direction through the system.

33. The method of claim 32, wherein the two pressure waves are originated in the system proximate to the pressure change sensing device.

34. The method of claim 27, the system further comprising a valve capable of suddenly releasing enough pressure from the system to create pressure waves in the system, the valve being in fluid communication with the interior of the system, and positioned proximate to the pressure change sensing device, the method further comprising the steps of:

pressurizing the system to a starting pressure; and, rapidly venting some of the fluid out through the valve, thereby causing a sudden pressure drop inside the system which generates the at least one pressure wave.

35. The method of claim 34, wherein the valve and pressure change sensing device are located proximate to the proximal end of the extension conduit.

36. The method of claim 34, wherein the valve is capable of releasing 100–500 pounds per square inch of pressure from the interior of the system in less than 3 seconds.

37. The method of claim 34, wherein the valve and pressure change sensing device are located between the fluid channel and extension conduit.

38. The method of claim 34, wherein the valve and pressure change sensing device are located between the distal and proximal ends of the extension conduit.

39. The method of claim 34, wherein the valve and pressure change sensing device are located between the distal and proximal ends of the unblocked section of the fluid channel.

40. The method of claim 27, wherein the wave generation is caused by an explosive charge.

41. The method of claim 27, wherein the pressure change sensing device is capable of measuring pressure.

42. The method of claim 41, wherein the pressure change sensing device is a pressure transducer.

43. The method of claim 42, wherein the pressure transducer is a strain gauge type transducer.

44. The method of claim 27, wherein the pressure change sensing device is operably connected to an output device capable of recording pressure changes over time.

45. The method of claim 44, wherein the output device is a strip chart recorder.

46. The method of claim 44, wherein the output device is a computer.

47. The method of claim 27, wherein the extension conduit is positioned approximately axially in-line with the fluid conduit.

48. The method of claim 27, wherein the length of the extension conduit is 10 to 30 feet.

49. The method of claim 27, wherein the system further comprises a needle valve operably connected to the distal end of the extension conduit.

50. The method of claim 27, wherein the fluid channel is further bounded by the interior of a tool pipe string.

51. The method of claim 27, wherein the fluid conduit is further bounded by an annulus, the annulus being defined between a casing in a well and production tubing.

* * * * *